United States Patent
Rosa et al.

(10) Patent No.: US 9,092,017 B2
(45) Date of Patent: Jul. 28, 2015

(54) ENERGY RECOVERY VENTILATION EFFECTIVENESS CALCULATION AND INDICATION

(75) Inventors: Alexis Rosa, Dallas, TX (US); Michael G. Longman, Coppell, TX (US); John Pinkston, Carrollton, TX (US)

(73) Assignee: AIR SYSTEM COMPONENTS, INC., Plano, TX (US)

(*) Notice: Subject to any disclaimer, the term of this patent is extended or adjusted under 35 U.S.C. 154(b) by 493 days.

(21) Appl. No.: 13/424,412

(22) Filed: Mar. 20, 2012

(65) Prior Publication Data

US 2013/0253707 A1   Sep. 26, 2013

(51) Int. Cl.
*G05B 13/00* (2006.01)

(52) U.S. Cl.
CPC ..................................... *G05B 13/00* (2013.01)

(58) Field of Classification Search
CPC .... G05B 13/00; F24F 12/006; F24F 11/0012; F24F 11/0013; F24F 11/0042; F24F 11/0086; Y02B 30/563

USPC .......... 700/21, 276, 277, 278, 301; 236/44 R, 236/44 A, 44 C, 92 R
See application file for complete search history.

(56) References Cited

U.S. PATENT DOCUMENTS

| | | | |
|---|---|---|---|
| 5,675,979 A | 10/1997 | Shah | |
| 6,755,035 B1 * | 6/2004 | McNamara et al. | 62/175 |
| 2011/0231020 A1 | 9/2011 | Ramachandran et al. | |
| 2012/0046909 A1 * | 2/2012 | Dazai | 702/182 |
| 2012/0125592 A1 * | 5/2012 | Fadell et al. | 165/201 |
| 2013/0124111 A1 * | 5/2013 | McKie et al. | 702/45 |
| 2014/0058806 A1 * | 2/2014 | Guenette et al. | 705/14.1 |

OTHER PUBLICATIONS

Canadian Patent Office; Office Action; Canadian Patent Application No. 2,809,855, Sep. 25, 2014, 3 pages.

* cited by examiner

*Primary Examiner* — Mohammad Ali
*Assistant Examiner* — Nathan Laughlin
(74) *Attorney, Agent, or Firm* — Jackson Walker L.L.P.; Christopher J. Rourk

(57) ABSTRACT

This disclosure relates generally to air handling systems for buildings, more particularly to energy recovery ventilation systems, and specifically to a calculation/estimation of effectiveness which may be used for informational and maintenance purposes.

11 Claims, 4 Drawing Sheets

ENERGY RECOVERY VENTILATION EFFECTIVENESS CALCULATION AND INDICATION

BACKGROUND

This disclosure relates generally to air handling systems for buildings, more particularly to energy recovery ventilation systems, and specifically to a calculation/estimation of effectiveness which may be used for informational and maintenance purposes.

SUMMARY

The present disclosure is directed to systems and methods which control energy recovery ventilation (ERV) systems of buildings. ERV systems may be used to recover energy and lower utility expenses. Energy recovery wheels rotate between the incoming outdoor air and the exhaust air. As the wheel rotates, it transfers a percentage of the heat and moisture differential from one airstream to the other. The outdoor air is pre-conditioned reducing the capacity and energy needed from the mechanical HVAC system. According to guidelines, building environments require a specific amount of fresh air to dilute contaminates in the space and provide ventilation for high concentrations of people. The required amount of fresh air may provide dilution of contaminates, to minimize the possibility of "sick building syndrome." Increasing the outside air intake lowers the carbon dioxide levels in the building, and may help keep the occupants alert and healthier. ERVs may also reduce indoor odors with fresh outside air that is brought into the building as stale air may be exhausted out of the building.

Effectiveness of the system may be calculated or very closely estimated and indicated to a user. This calculation may also be used to indicate inefficiencies in the system. It may also be used to indicate maintenance may be needed for components in the system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The accompanying drawings, which are incorporated in and form part of the specification in which like numerals designate like parts, illustrate embodiments of the present disclosure and together with the description, serve to explain the principles of the disclosure. In the drawings.

DETAILED DESCRIPTION

Figure 1:
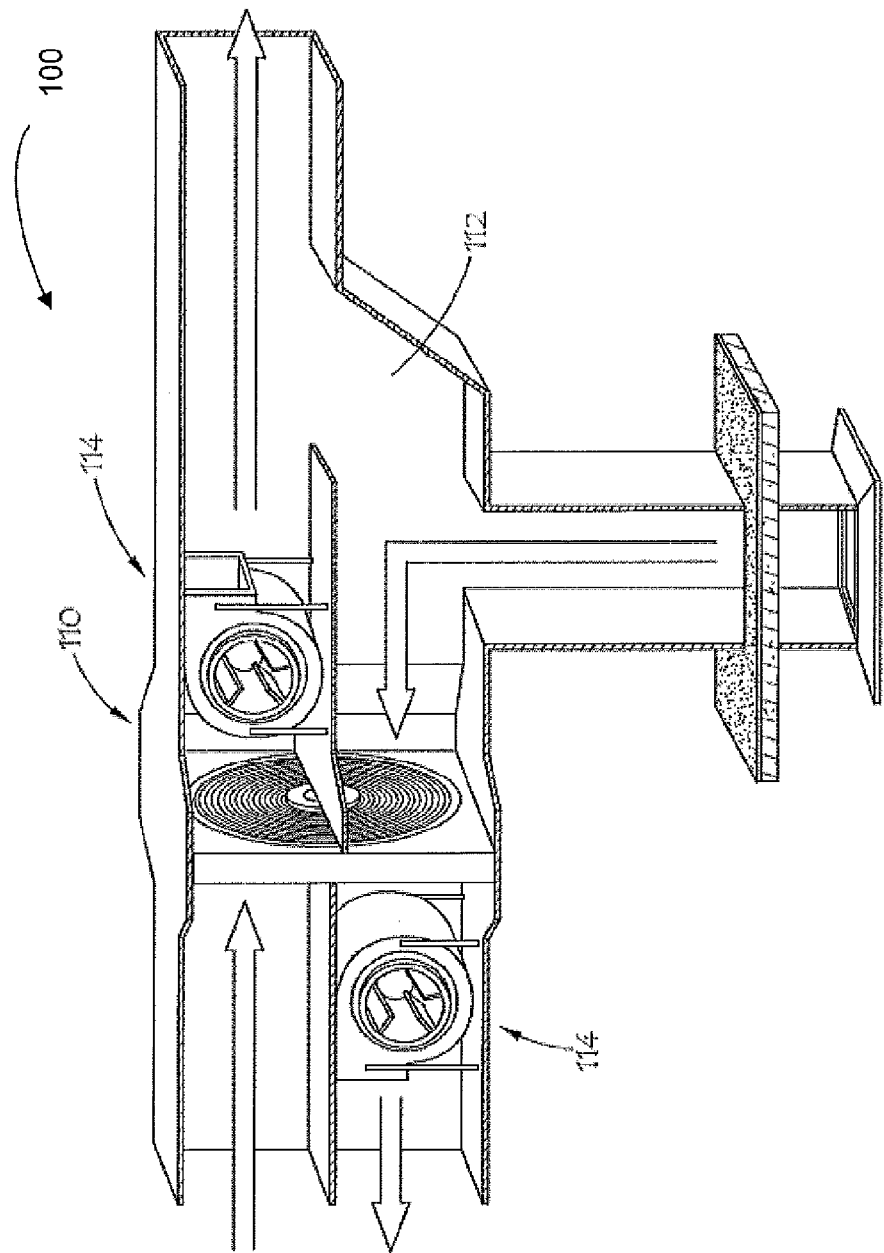
FIG. 1 is a plan view of an energy recovery ventilation system.

FIG. 1 shows a general ERV system 100. System 100 may be an air-to-air type heat exchanger. System 100 may include an energy recovery ventilation wheel, or thermal wheel, or enthalpy wheel (wheel) 110. As the wheel rotates between the ventilation and exhaust air streams it may pick up heat energy and releases it into the colder air stream. In different seasons the inside or the outside air may have more heat and moisture, and thereby more energy.

The system 100 in FIG. 1 may show an embodiment where the outside air is warmer than the inside air. As can be seen, the conditioned inside air (return and supply/tempered) that is being exhausted may mix with the incoming outside air, via an opening 112 and the wheel 110, to lower the temperature, and raise the relative humidity. This helps reduce the amount of energy used by the air conditioning and handling system to bring the temperature down to the set point of the system.

It will be appreciated that when the outside air is cooler and the building is to be heated, the exhausted inside air will be used to warm the incoming outside air to reduce power consumption of the ERV.

System 100 may also include one or more blowers 114 to aid the exchange of air to and from the building (not shown).

Figure 2:
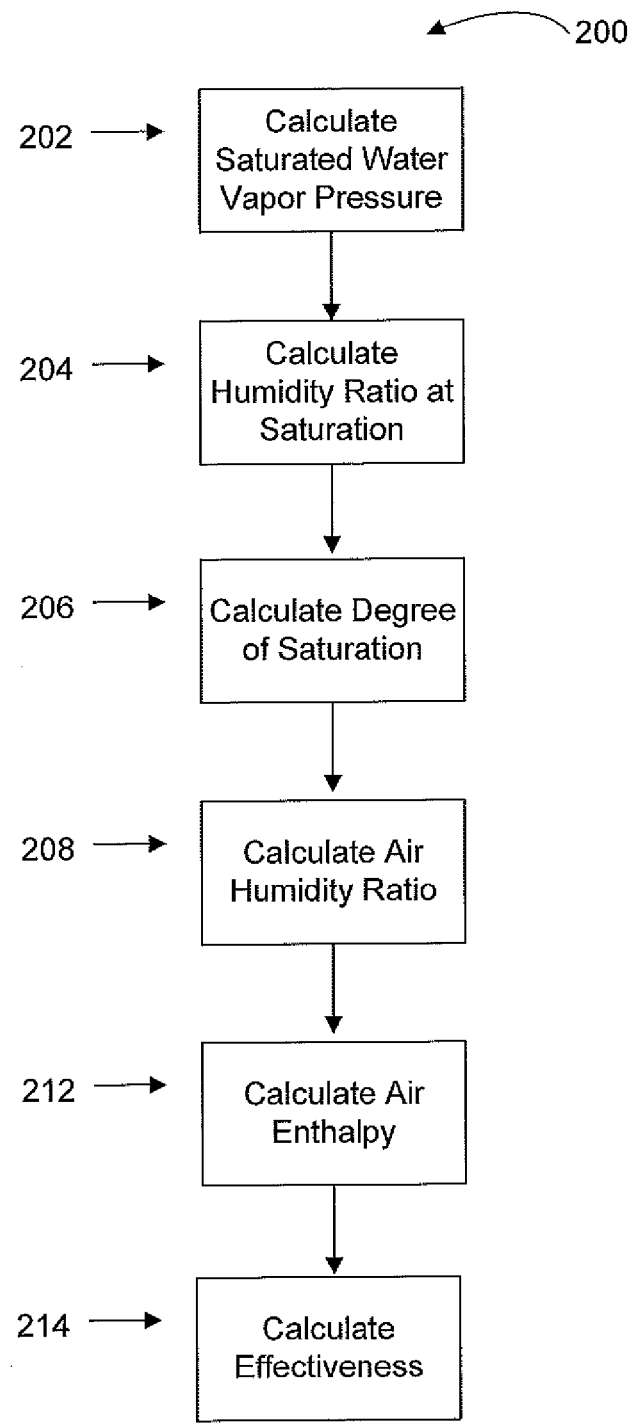
FIG. 2 is a flowchart of a method according to an embodiment.

FIG. 2 is a flow chart of a method 200 of calculating effectiveness of an ERV system, according to an embodiment. Method 200 may include the step of calculating the saturated water vapor pressure 202. Saturated water vapor pressure ($P_{ws}$) may be calculated using the following equations:

For $-148 < T < 32$ degrees Fahrenheit the equation is:

$$P_{ws} = \exp\wedge\left(\frac{C_1}{T} + C_2 + C_3 T + C_4 T^2 + C_5 T^3 + C_6 T^4 + C_7 \ln(T)\right) \quad \text{(Eq. 1)}$$

For $32 < T < 392$ degrees Fahrenheit the equation is:

$$P_{ws} = \exp\wedge\left(\frac{C_8}{T} + C_9 + C_{19} T + C_{11} T^2 + C_{12} T^3 + C_{13} \ln(T)\right) \quad \text{(Eq. 2)}$$

Where temperature T is in degrees Rankin, $P_{ws}$ is water vapor saturation pressure in pounds per square inch (psi), and where:

i. $C_1 = 4.0214165\ E4$
$C_2 = -4.893242\ E00$
$C_3 = -5.376579\ E-3$
$C_4 = 1.920237\ E-7$
$C_5 = 3.5575832\ E-10$
$C_6 = -9.034468\ E-14$
$C_7 = 4.1635019\ E00$
$C_8 = -1.0440397\ E4$
$C_9 = -1.1294650\ E1$
$C_{10} = -2.7022355\ E-2$
$C_{11} = 1.2890360\ E-5$
$C_{12} = -2.478068\ E-9$
$C_{13} = 6.545967\ E00$

The temperature may be measured within the system and converted to degrees Rankin. Once the saturated water vapor pressure is calculated at 202, the value found in step 202 may be used in step 204 to calculate the air humidity ratio at saturation with the following equation:

$$W_s = 0.62198 \frac{P_{ws}}{(P - P_{ws})} \quad \text{(Eq. 3)}$$

Where $W_s$ is the air humidity ratio at saturation, P is the gas pressure measured with a sensor from within the system, and $P_{ws}$ is the saturated water vapor pressure from the calculation at 202.

Once the air humidity ratio at saturation is calculated, it may be used at step 206 to calculate degree of saturation µ, using the following equation $$\mu = \frac{\phi}{1 + (1-\phi)\frac{W_s}{0.62198}} \quad \text{(Eq. 4)}$$

Where µ is the degree of saturation and φ is the relative humidity measured by a sensor within the system. Once degree of saturation is calculated it may be used to calculate air humidity ratio W at step 208. Air humidity ratio may be calculated using the following equation:

$$W = \mu W_s \quad \text{(Eq. 5)}$$

Where W is the air humidity ratio and µ is the degree of saturation, and $W_s$ is the air humidity ratio at saturation calculated at step 204. Once the air humidity ratio W is calculated it may be used to calculate the air enthalpy h at step 212. Air enthalpy h may be calculated with the following equation:

$$h = h_a T + W h_g \quad \text{(Eq. 6)}$$

Where h is the air enthalpy, $h_a$ is the specific enthalpy of air, which is 0.240 T in Btu/lb. Where $h_g$ is the specific enthalpy of water vapor, which is 1061+0.444 T in Btu/lb. T is the temperature in degree Fahrenheit measured by a sensor in the system. Once the air enthalpy h is calculated, it may be used to find latent effectiveness $\epsilon_L$, sensible effectiveness $\epsilon_S$, and total effectiveness $\epsilon_T$ at step 214. Latent effectiveness $\epsilon_L$ may be calculated by the following equation:

$$\varepsilon_L = \frac{m_s(W_{sa} - W_{oa})}{m_{min}(W_{ra} - W_{oa})} \quad \text{(Eq. 7)}$$

Where $\epsilon_L$ is the latent effectiveness,
$W_{sa}$ is the humidity ratio of supply air,
$W_{oa}$ is the humidity ratio of outside air,
$W_m$ is the humidity ratio of supply air.
$m_{min}$ is the minimum mass flow rate from supply air and exhaust air.
$m_s$ is the maximum flow rate from supply and exhaust air.
Sensible effectiveness $\epsilon_S$ may be calculated by the following equation:

$$\varepsilon_S = \frac{m_s(T_{sa} - T_{oa})}{m_{min}(T_{ra} - T_{oa})} \quad \text{(Eq. 8)}$$

Where $T_{sa}$ is the temperature of supply air, $T_{oa}$ is the temperature of outside air, and $T_{ra}$ is the temperature of return air.

Total effectiveness $E_T$ may be calculated by the following equation:

$$\varepsilon_T = \frac{m_s(h_{sa} - h_{oa})}{m_{min}(h_{ra} - h_{oa})} \quad \text{(Eq. 9)}$$

Where $\epsilon_T$ is the total effectiveness, $h_{as}$ is the specific enthalpy of supply air, $h_{oa}$ is the specific enthalpy of the outside air, and $h_{ra}$ is the specific enthalpy of the return air.

Total, sensible, and latent effectiveness may be calculated because it may provide the end user of the system a generally real-time performance of sensible (heat), latent (moisture), and total (heat and moisture) energy transferred between outside air and building (supply and return) air conditions.

All three are shown because Air conditioning, Heating, and Refrigeration Institute (AHRI) Standard 1060 for air-to-air recovery ventilation equipment require all certified equipment to repot rating of equipment based on sensible, latent, and total effectiveness.

All of these values are calculated for the outside air, exhaust air, return air, and supply air. When the system is cooling, the outside air calculation is used along with the supply air and the outside air. When the system is heating the return air calculation is used along with the supply air and the outside air.

Figure 3:
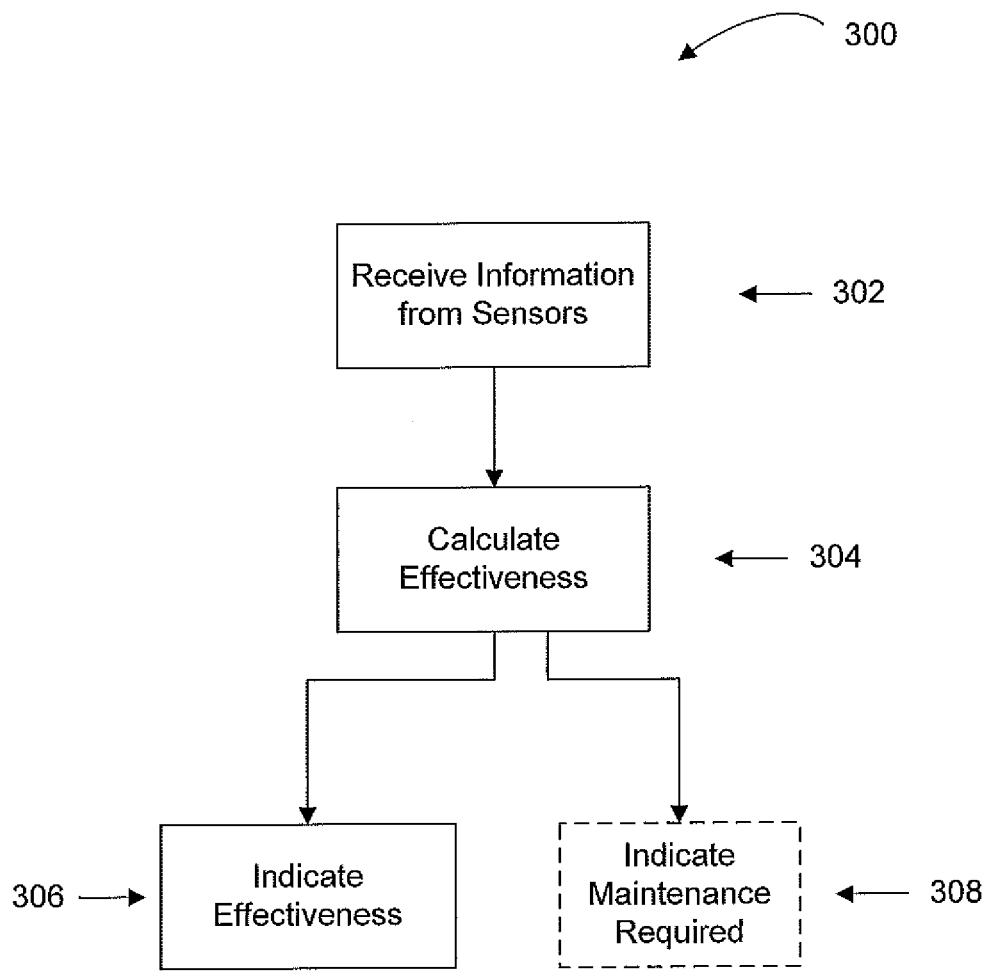
FIG. 3 is a flowchart of a method according to an embodiment.

FIG. 3 is a flow chart of a method 300 of indicating the effectiveness of the system, and optionally indicating a need for maintenance, according to an embodiment. Method 300 may include the step of receiving information from system sensors at 302. The system sensors may include, but are not limited to, pressure, temperature, enthalpy, and humidity.

The signals from the sensors may be received by a processor or control module. The processor may then use these readings from the sensors to calculate effectiveness at 304. The calculation may be similar to the calculations described with regard to FIG. 2, but also may include other and/or alternate calculations as well.

At 306, the calculated effectiveness(es) may be indicated. This indication may be as a number or graph shown on a graphical user interface (GUI), numerical display, and/or other user interface. The GUI may be in many forms including an Android operating system application, on the PC, and/or a dedicated GUI at the controls of the system. It will be appreciated that any other GUI method or may be used without straying from the spirit and scope of this disclosure.

This indication may also indicate to a user the savings by the system to show a payback of costs for the installation and purchase of the system. This may also indicate inefficiencies in the system, which may facilitate changing the settings of the system to increase effectiveness. A lower effectiveness might indicate that the user should change the airflow balance, filters, ERV wheel, belt tension, and/or air leakage and/or other system portion.

At 308, an optional maintenance indication may occur. The system may alert a user that the system may need maintenance. A low effectiveness may indicate that maintenance is required. The indication may be a warning light or message or other indication. This indication may also include proposed setting changes and/or likely portion of the system to check to for maintenance, and/or other information.

Figure 4:
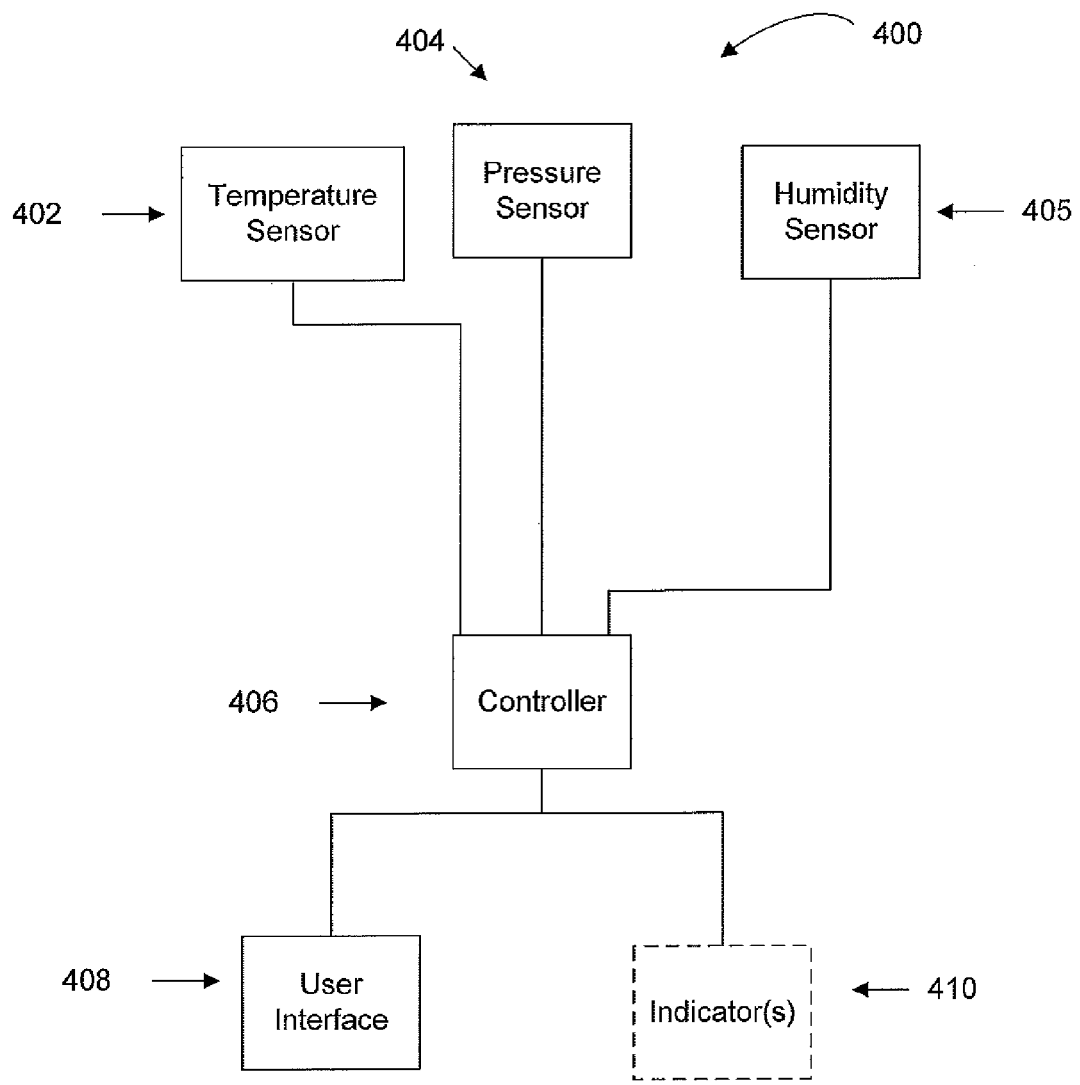
FIG. 4 is a schematic of an energy recovery ventilation control system, according to an embodiment.

FIG. 4 shows a system 400 which may be capable of calculating and indicating effectiveness of an HVAC system, according to an embodiment. System 400 may include a temperature sensor 402, a pressure sensor 404, a humidity sensor 405, a controller 406, and user interface 408, and optionally an indicator 410.

Temperature sensor 402 may be capable of sensing temperature and outputting a temperature signal generally corresponding to the temperature sensed. Similarly, pressure sensor 404 may be capable of sensing pressure of the environment it is in, and outputting a pressure signal based at least in part on the pressure sensed. Humidity sensor 405 may be capable of sensing humidity and outputting a humidity signal generally corresponding to the humidity sensed. It will be appreciated that other sensors may also be included in the system based at least in part upon the parameters needed to calculate effectiveness and/or other characteristics of the system.

System 400 may also include a controller 406. Controller 406 may be capable of receiving the temperature, pressure, humidity and other signals and converting the signals to information which may be used by the controller 406. The controller 406 may use the information in calculation, comparisons, and/or in other programming. Controller 406 may include a processor capable of running a computer program or the like.

Controller 406 may also be capable of calculating the effectiveness of the system, based at least in part upon the signals received from the sensors. Controller 406 may also be capable of outputting an indication of the effectiveness to the user interface 408 and/or to indicators 410.

Controller 406 may be capable of receiving the data outlined above with reference to FIG. 2, as well as other information. Controller 406 may be a portion of a printed circuit board, and/or any other form capable of achieving the tasks disclosed herein.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The disclosure disclosed herein may suitably be practiced in the absence of any element that is not specifically disclosed herein.

What is claimed is:

1. A method, comprising:
sensing one or more parameters by one or more sensors from within an air handling system;
transmitting an indication of the sensed parameters by said sensors to a processor;
calculating an effectiveness metric by said processor based at least in part on the transmitted indications;
calculating a humidity ratio at saturation based at least in part on the calculated saturated water vapor pressure;
calculating a degree of saturation based at least in part on the calculated humidity ratio at saturation;
comprising calculating an air humidity ratio of the system based at least in part on the calculated degree of saturation;
calculating an air enthalpy of the system based at least in part on the calculated air humidity ratio; and
transmitting the calculated effectiveness metric to a module, wherein calculating the effectiveness metric by the processor based at least in part on the transmitted indications comprises calculating saturated water vapor pressure of an air handling system, based at least in part on a received temperature indication.

2. The method of claim 1 further comprising calculating the effectiveness based at least in part on a measured pressure.

3. The method of claim 2 further comprising displaying total effectiveness, sensible effectiveness and latent effectiveness.

4. The method of claim 2 further comprising displaying total effectiveness, sensible effectiveness or latent effectiveness.

5. The method of claim 1 further comprising:
calculating the effectiveness based at least in part on a measured pressure; and
displaying total effectiveness, sensible effectiveness and latent effectiveness.

6. The method of claim 1 further comprising displaying total effectiveness, sensible effectiveness and latent effectiveness.

7. The method of claim 1 further comprising displaying total effectiveness, sensible effectiveness or latent effectiveness.

8. An article, comprising:
a non-transitory signal bearing medium comprising machine-readable instructions stored thereon, which, if executed by one or more processors, operatively enable a computing device to calculate the effectiveness of an air handling system by:
calculate saturated water vapor pressure of an air handling system, based at least in part on a received temperature indication;
calculate a humidity ration at saturation based at least in part on the calculated saturated water vapor pressure;
calculate the degree of saturation based at least in part on the calculated humidity ration at saturation;
calculate the air humidity ratio of the system based at least in part on the calculated degree of saturation;
calculate the air enthalpy of the system based at least in part on the calculated air humidity ratio; and
calculating the effectiveness based at least in part on a measure pressure; and
utilizing the calculated effectiveness for information about the system.

9. The article of claim 8, wherein said medium comprising machine-readable instructions comprises further instructions to transmit the calculated effectiveness to a user interface.

10. The article of claim 8, wherein said medium comprising machine-readable instructions comprises further instructions to provide an indication the system requires maintenance based at least in part on the calculated effectiveness.

11. The article of claim 8, wherein said medium comprising machine-readable instructions comprises further instructions to transmit the calculated effectiveness to a user interface and to provide an indication the system requires maintenance based at least in part on the calculated effectiveness.

* * * * *

UNITED STATES PATENT AND TRADEMARK OFFICE
CERTIFICATE OF CORRECTION

PATENT NO. : 9,092,017 B2  
APPLICATION NO. : 13/424412  
DATED : July 28, 2015  
INVENTOR(S) : Alexis Rosa, Michael G. Longman and John Pinkston Page 1 of 1

It is certified that error appears in the above-identified patent and that said Letters Patent is hereby corrected as shown below:

Claims  
Column 5, line 64, Claim 1, replace "the" with "a"  
Column 6, line 1, Claim 1, delete "comprising"  
Column 6, line 13, Claim 2, insert --metric-- after "effectiveness"  
Column 6, line 21, Claim 5, insert --metric-- after "effectiveness"  
Column 6, line 35, Claim 8, replace "the" with "an"  
Column 6, line 40, Claim 8, replace "ration" with "ratio"  
Column 6, line 42, Claim 8, replace "the" with "a"  
Column 6, line 43, Claim 8, replace "ration" with "ratio"  
Column 6, line 44, Claim 8, replace "the" with "an"  
Column 6, line 46, Claim 8, replace "the" with "an"  
Column 6, line 49, Claim 8, replace "measure" with "measured"

Signed and Sealed this  
Twenty-ninth Day of December, 2015

Michelle K. Lee  
*Director of the United States Patent and Trademark Office*